United States Patent
Singla et al.

(10) Patent No.: US 10,755,583 B2
(45) Date of Patent: Aug. 25, 2020

(54) SYSTEM AND METHOD FOR MONITORING COMPLIANCE WITH AIR TRAFFIC CONTROL INSTRUCTIONS

(71) Applicant: HONEYWELL INTERNATIONAL INC., Morris Plains, NJ (US)

(72) Inventors: Abneesh Singla, Karnataka (IN); Sreenivasan Govindillam K, Karnataka (IN); Srinivas D. Gonabal, Karnataka (IN); Pradeep Huncha, Karnataka (IN); Vedavyas Rallabandi, Karnataka (IN); Jaibir Singh, New Delhi (IN); Sunil Kumar KS, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 240 days.

(21) Appl. No.: 15/790,220

(22) Filed: Oct. 23, 2017

(65) Prior Publication Data
US 2019/0122564 A1 Apr. 25, 2019

(51) Int. Cl.
*G08G 5/00* (2006.01)
*G08G 5/02* (2006.01)
*G06F 3/16* (2006.01)

(52) U.S. Cl.
CPC ......... *G08G 5/0013* (2013.01); *G08G 5/0021* (2013.01); *G08G 5/0026* (2013.01); *G08G 5/0082* (2013.01); *G06F 3/167* (2013.01); *G08G 5/006* (2013.01); *G08G 5/025* (2013.01)

(58) Field of Classification Search
USPC ........................................................ 701/120
See application file for complete search history.

(56) References Cited

U.S. PATENT DOCUMENTS

| | | |
|---|---|---|
| 9,443,433 B1 | 9/2016 | Conway et al. |
| 9,446,852 B2 | 9/2016 | Lacko et al. |
| 9,620,020 B2 | 4/2017 | Wang et al. |

(Continued)

FOREIGN PATENT DOCUMENTS

| | | |
|---|---|---|
| EP | 1318492 A2 | 6/2003 |
| EP | 2159544 A1 | 3/2010 |

(Continued)

OTHER PUBLICATIONS

European Patent Office, European Extended Search Report for Application No. 18201653.5 dated Apr. 3, 2019.

*Primary Examiner* — James M McPherson
(74) *Attorney, Agent, or Firm* — Lorenz & Kopf, LLP

(57) ABSTRACT

A method is provided for monitoring compliance with air traffic control (ATC) instructions by an air crew of an aircraft. First, voice and text ATC commands are received by an ATC instruction moderator support system (AIMSS) located on board the aircraft. The voice and text ATC commands are converted into a data format by the AIMSS. The ATC commands are used to determine an expected aircraft state while a current aircraft state is determined by the aircraft sensors. The current aircraft state is compared with the expected state and determined if it is in compliance. If the current state is in non-compliance, it is determined if the non-compliance is allowable and it is then classified as either no action or incorrect action by the aircrew. Finally, an alert of the noncompliance is generated with the AIMSS.

18 Claims, 6 Drawing Sheets

(56) References Cited

U.S. PATENT DOCUMENTS

| | | | |
|---|---|---|---|
| 2003/0193408 A1* | 10/2003 | Brown | G08G 5/0086 |
| | | | 340/945 |
| 2006/0046715 A1 | 3/2006 | Burgemeister | |
| 2010/0027768 A1 | 2/2010 | Foskett | |
| 2010/0030401 A1* | 2/2010 | Rogers | G01C 23/00 |
| | | | 701/3 |
| 2010/0152924 A1 | 6/2010 | Pandit et al. | |
| 2013/0173090 A1* | 7/2013 | Rieunier | G08G 5/0039 |
| | | | 701/3 |
| 2014/0257602 A1* | 9/2014 | Gaston | G08G 5/025 |
| | | | 701/16 |
| 2015/0364044 A1 | 12/2015 | Kashi et al. | |
| 2017/0039858 A1* | 2/2017 | Wang | G10L 25/51 |
| 2017/0076611 A1* | 3/2017 | Shamasundar | G08G 5/0013 |

FOREIGN PATENT DOCUMENTS

| | | |
|---|---|---|
| EP | 3128500 A2 | 2/2017 |
| WO | 2015002675 A1 | 1/2015 |

\* cited by examiner

SYSTEM AND METHOD FOR MONITORING COMPLIANCE WITH AIR TRAFFIC CONTROL INSTRUCTIONS

TECHNICAL FIELD

The present invention generally relates to aircraft operations, and more particularly relates to a system and method for monitoring compliance with air traffic control instructions by a crew of an aircraft.

BACKGROUND

Human error is postulated to be the majority cause of deviations from air traffic control (ATC) instructions and directions on flight operations. Most often, ATC provides voice or data format instructions to which a pilot complies. However, some information that is passed from ATC may be missed due to several factors including cockpit workload. Hence, there is a need for a system and method for monitoring compliance with ATC instructions.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for monitoring compliance with air traffic control (ATC) instructions by an air crew of an aircraft. The method comprises: receiving voice and text ATC commands with an ATC instruction moderator support system (AIMSS) on board the aircraft; converting the voice and text ATC commands into a data format with the AIMSS; determining an expected aircraft state with the AIMSS based on the data formatted ATC commands; determining a current aircraft state with the AIMSS based on flight performance sensors on board the aircraft; determining if the current aircraft state is in non-compliance with the expected aircraft state; determining if the non-compliance is allowable based on predetermined exceptions to ATC commands, where no alert for the aircrew is generated if the non-compliance is allowable; classifying the non-compliance by the aircrew as either no action or incorrect action; and generating an alert with the non-compliance classification for the air crew with the AIMSS if the current aircraft state is not in compliance with the expected aircraft state.

A system is provided for monitoring compliance with air traffic control (ATC) instructions by an air crew of an aircraft. The system comprises: a radio on board the aircraft that receives voice and text ATC commands; flight sensors on board the aircraft that collect flight data reflecting the current state of the aircraft; an ATC instruction moderator support system (AIMSS) on board the aircraft that, receives the voice and text commands, converts the voice and text ATC commands into a data format, determines an expected aircraft state based on the data formatted ATC commands, receives the current state of the aircraft from the flight sensors and compares the current state of the aircraft with the expected state of the aircraft, and generates an alert if the current state of the aircraft is in non-compliance with the expected state of the aircraft; and a crew interface that receives and displays the alert to the air crew.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for monitoring compliance with ATC instructions by an air crew of an aircraft has been developed. First, voice and text ATC commands are received by an ATC instruction moderator support system (AIMSS) located on board the aircraft. The voice and text ATC commands are converted into a data format with the AIMSS and used to determine the expected aircraft state according to the commands. The AIMSS also determines the current aircraft state from performance sensors on board the aircraft. The current state is compared with the expected state by the AIMSS. If the aircraft is in noncompliance with the expected aircraft state, the AIMSS determines if the noncompliance is allowable based on predetermined exceptions to the ATC commands. If the noncompliance is allowable, no alert for the aircrew is generated. Also, the noncompliance is classified as either no action was taken by the aircrew or incorrect action was taken by the aircrew. If the noncompliance with the expected state is found to be not allowable, the AIMSS generates an alert for the aircrew.

Figure 1:
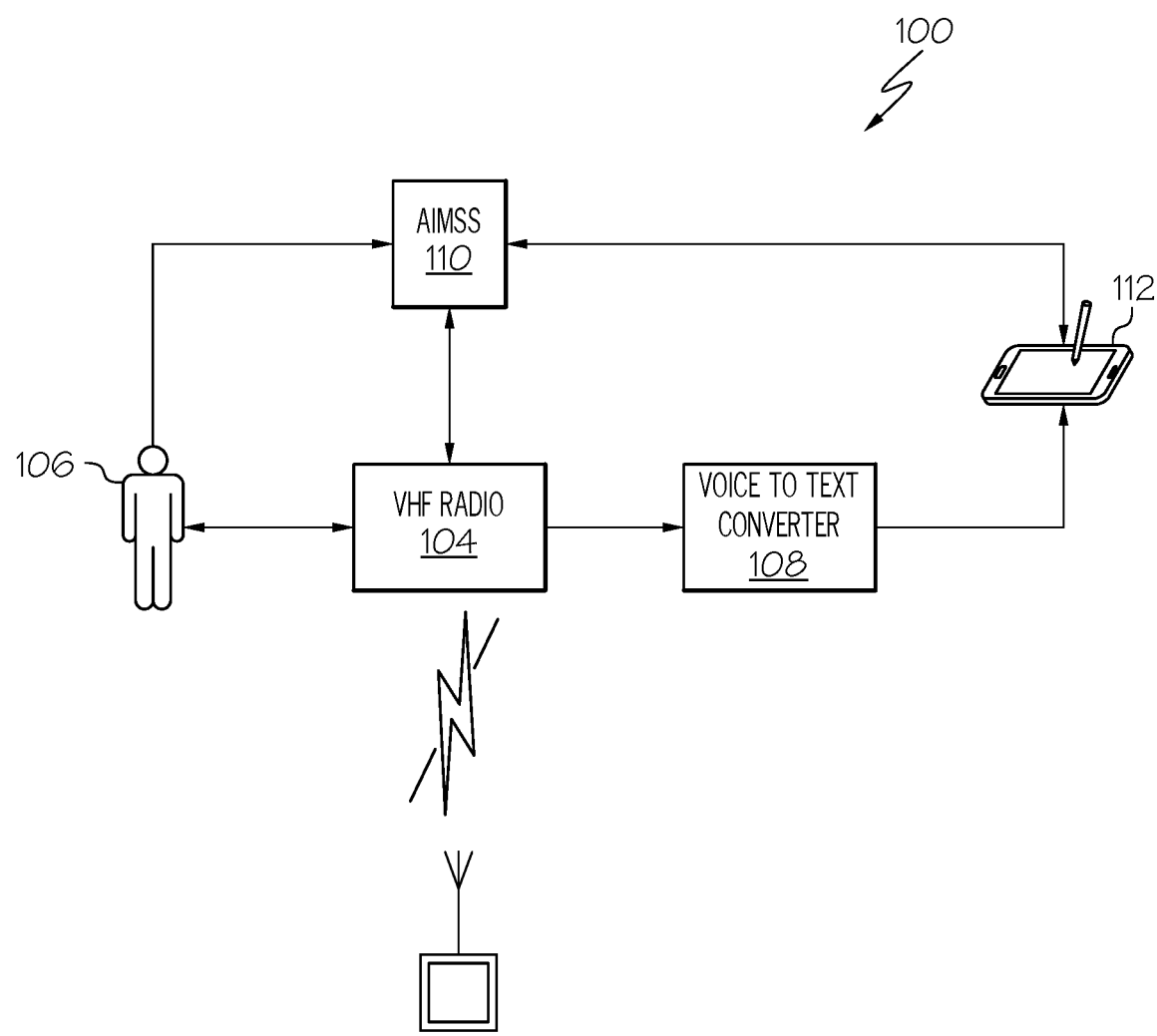
FIG. 1 shows a block diagram of ATC instruction moderator support system (AIMSS) in accordance with one embodiment.

Turning now to FIG. 1, a block diagram 100 is shown of an AIMSS for monitoring compliance with ATC instructions according to one embodiment. First, the ATC ground station 102 issues either voice or text commands that are received by a VHF radio 104 on board the aircraft. Voice commands are received by aircrew personnel 106 directly from the radio 104. Additionally, voice commands are processed on a voice to text converter 108 and displayed on a crew interface system 112 along with the ATC text commands. The AIMSS 110 monitors actions by the aircrew personnel 106 along with the voice or text commands from the radio 104 and the interface 112 via the voice to text converter 108. If the AIMSS 110 detects any noncompliance with the expected state of the aircraft from the ATC commands, alerts will be sent to the crew interface 112. Notification of an alert may also be sent to the ATC ground station 102 via the radio 104.

Figure 2:
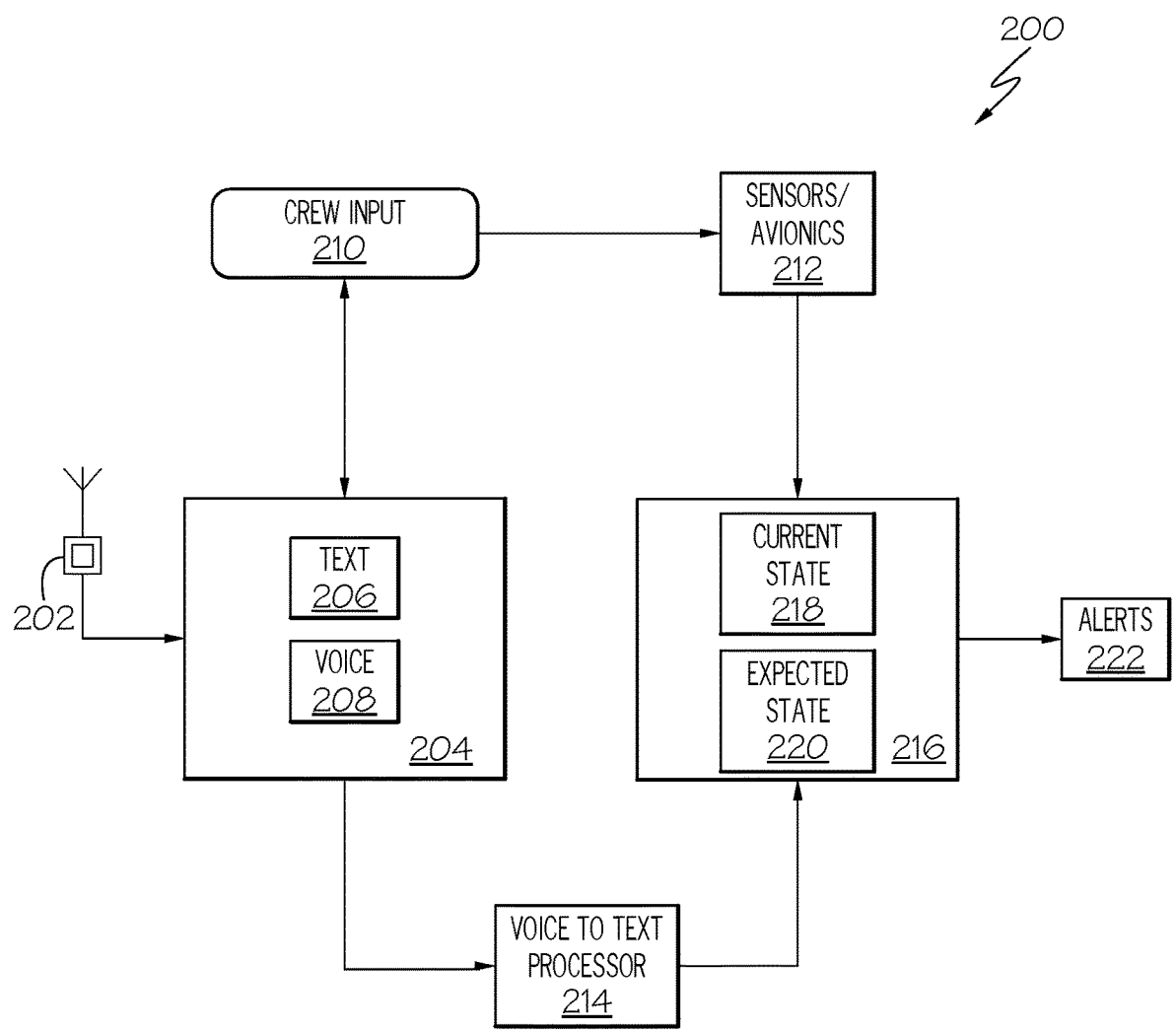
FIG. 2 shows a block diagram of a system for monitoring compliance with ATC instructions in accordance with one embodiment.

Turning now to FIG. 2, a block diagram 200 is shown of a system for monitoring compliance with ATC instructions in accordance with an alternative embodiment. Voice and text ATC commands are transmitted by a ground station 202 to a receiver 204 on board the aircraft. The text commands, for example, are received by a controller-pilot datalink communications (CPDLC) system 206 while the voice commands are received, for example, by a VHF radio system 208. The voice commands are processed by a voice to text processor 214 and transmitted to an AIMSS 216 along with the text messages. The AIMSS 216 uses this information to determine the expected state of the aircraft 220. The voice and text commands are simultaneously transmitted to the aircrew for their compliance. The aircrew response to the commands 210 is indicated by the sensors and avionics aboard the aircraft 212.

The AIMSS 216 monitors these sensors 212 and determines the current state of the aircraft 218. If the current state of the aircraft 218, is in non-compliance with the expected state of the aircraft 220, the AIMSS 216 will first determine if the non-compliance is allowable based on predetermined exceptions to the ATC commands. Examples of predetermined exceptions may include: a Controlled Flight into Terrain (CFIT) alert; a Resolution Advisory (RA) provided by a Traffic Collision Avoidance System (TCAS); a Pre-Selector Altitude (PSA) setting for a missed approach altitude; and any other standard operating procedures (SOP) for the aircraft during normal aircraft operations. If the non-compliance is a valid predetermined exception to it the ATC command, the AIMSS 216 will not send an alert. Additionally, the AIMSS 216 will delay generating an alert for a defined time period in order to give the aircrew adequate time to bring the current aircraft state into compliance with the air expected aircraft state after the aircrew acknowledges the ATC command.

In some embodiments, the AIMSS 216 may also classify the non-compliance as either critical or noncritical. In other embodiments, the AIMSS 216 may classify the noncompliance as due to incorrect action upon the part of the aircrew or no action on the part of the aircrew. Also, the AIMSS 216 may determine desired corrective actions for the aircrew to correct the non-compliance. These corrective actions may be selected from an onboard rules database. The rules database may incorporate the current aircraft state in the selection of the desired corrective actions.

After the noncompliance is detected, the AIMSS 216 may issue an alert 222 to the aircrew that is received and displayed by a crew interface on board the aircraft. The alert may be one of, or various combinations of, a visual display, a textual message, or an aural alert. An alert for a noncritical component noncompliance may be a simple visual cue. In other embodiments, the noncompliance alert may also be transmitted to the ATC ground station 202 in addition to the air crew.

Figure 3:
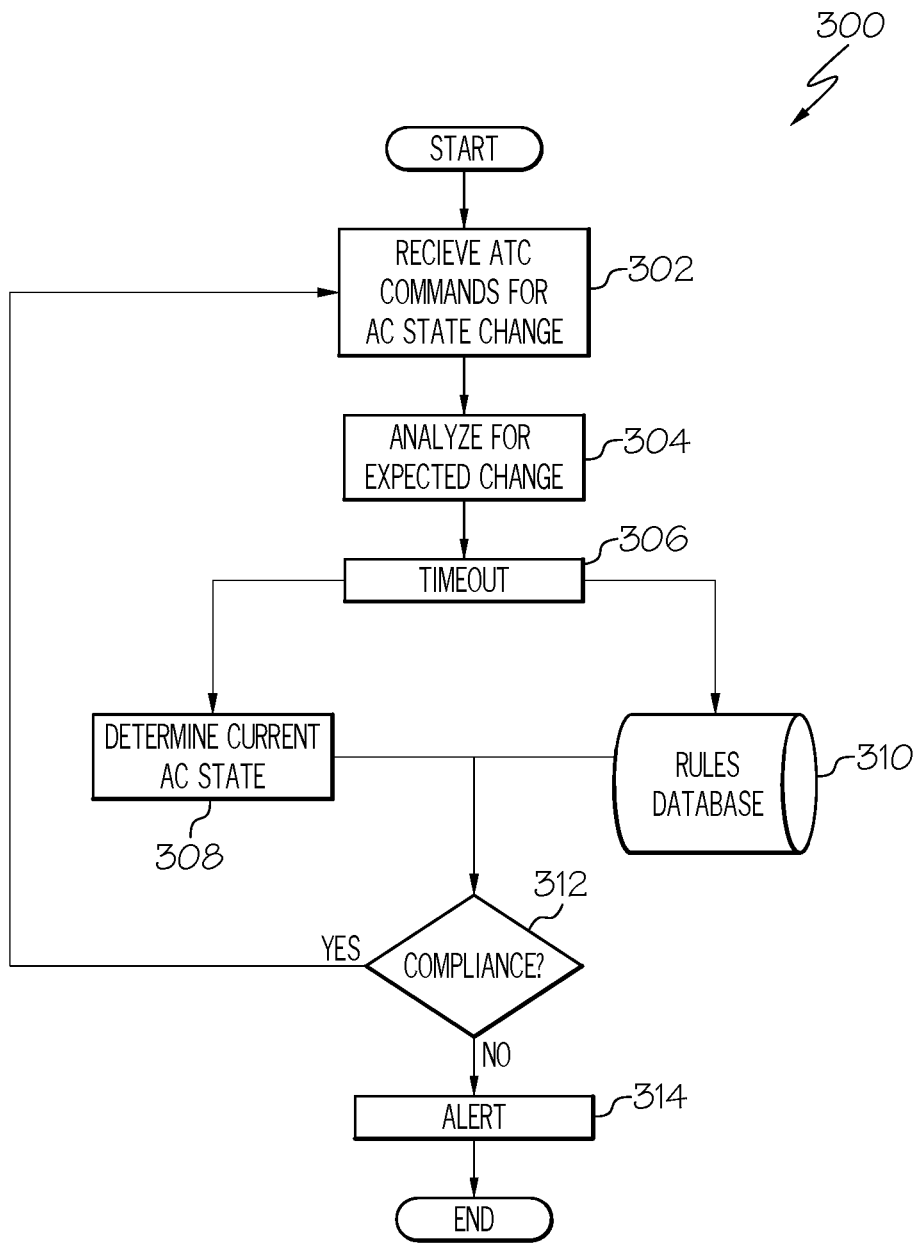
FIG. 3 shows a flowchart of a method for monitoring compliance with ATC instructions in accordance with one embodiment.

Turning now to FIG. 3, a flowchart 300 is shown for a method of monitoring compliance with ATC commands in accordance with an alternative embodiment. In this embodiment, ATC commands (voice and text) requiring an aircraft state change are received by the aircraft 302. The AIMSS receives and analyzes the ATC commands to determine the expected change in the aircraft state 304. A timeout is taken for defined period of time 306 to allow the aircrew to acknowledge and comply with the ATC commands. The AIMSS determines the current aircraft state 308 after the timeout. If the current state is in non-compliance with the expected state, an onboard rules database is consulted 310 to select the desired corrective actions on the part of the aircrew. The desired corrective action may be selected with reference to the current aircraft state. The AIMSS monitors compliance with the ATC instructions and the desired corrective actions 312. If the noncompliance of the expected state is still valid, and alert is issued to the aircrew 314. If compliance with the expected state is achieved, communications with the ATC is continuously monitored for further commands to change the aircraft state.

Figure 4A:
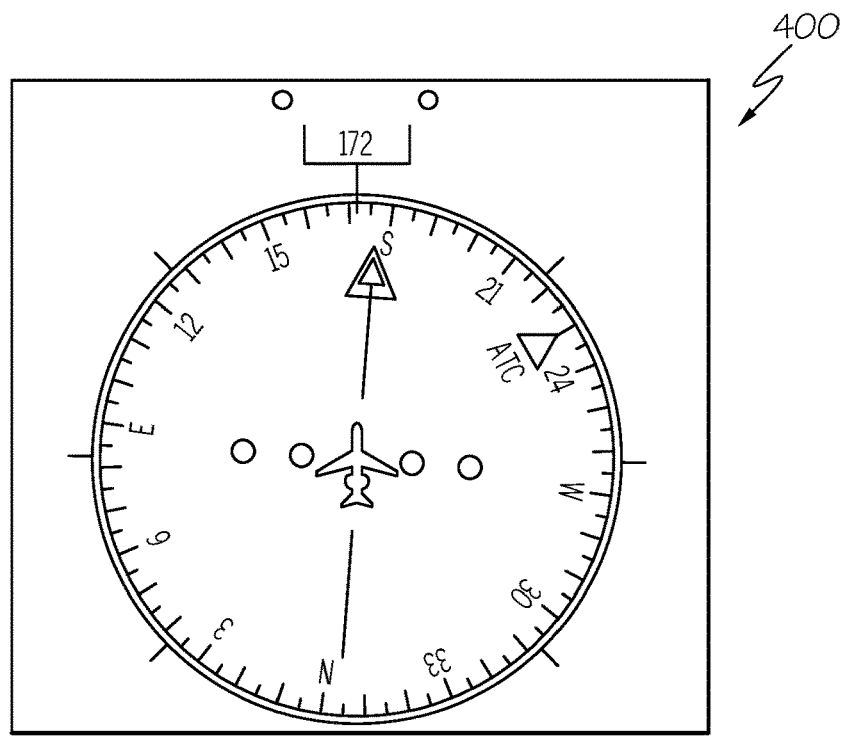
FIGS. 4a-4c show a series of displays for compliance and noncompliance with ATC commands for aircraft heading in accordance with one embodiment.
Figure 4B:
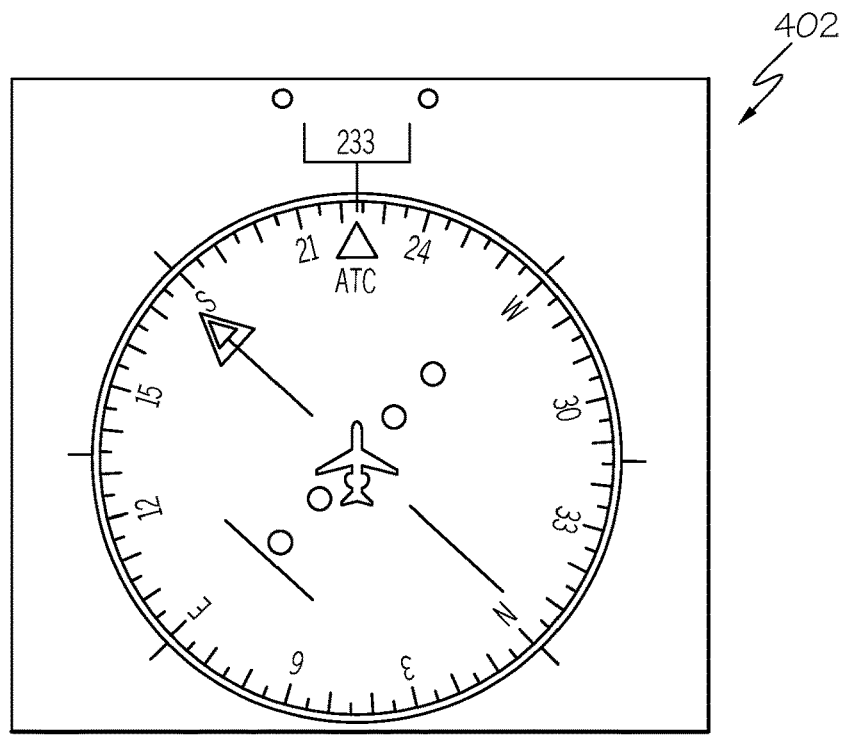
Figure 4C:
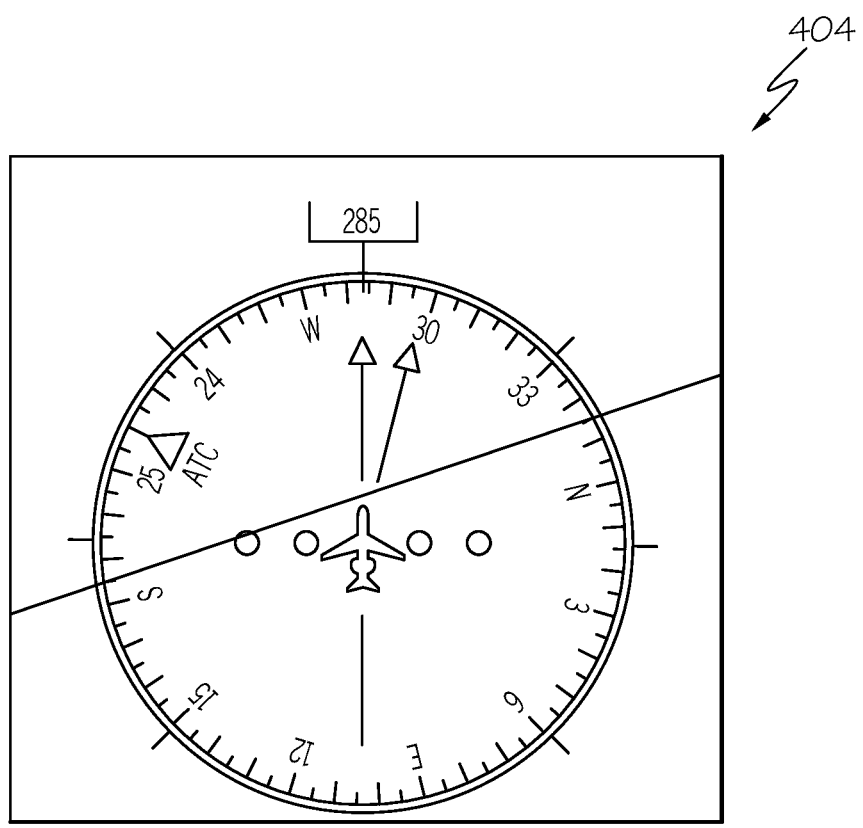

Turning now to FIGS. 4a-4c, a series of displays are shown that demonstrate examples of both compliance and noncompliance with ATC commands for the aircraft heading. FIG. 4a shows a display 400 of an aircraft with the current heading of 172°. At this point, ATC instructs the aircraft to change heading to 223° and the crew acknowledges the command. In FIG. 4B, the display 402 shows compliance with the ATC command as the aircrew sets the aircraft heading to 223°. In contrast, FIG. 4C shows a display 404 where the crew acknowledges the ATC command but sets the aircraft heading to 285° instead of the instructed heading of 223°.

Figure 5A:
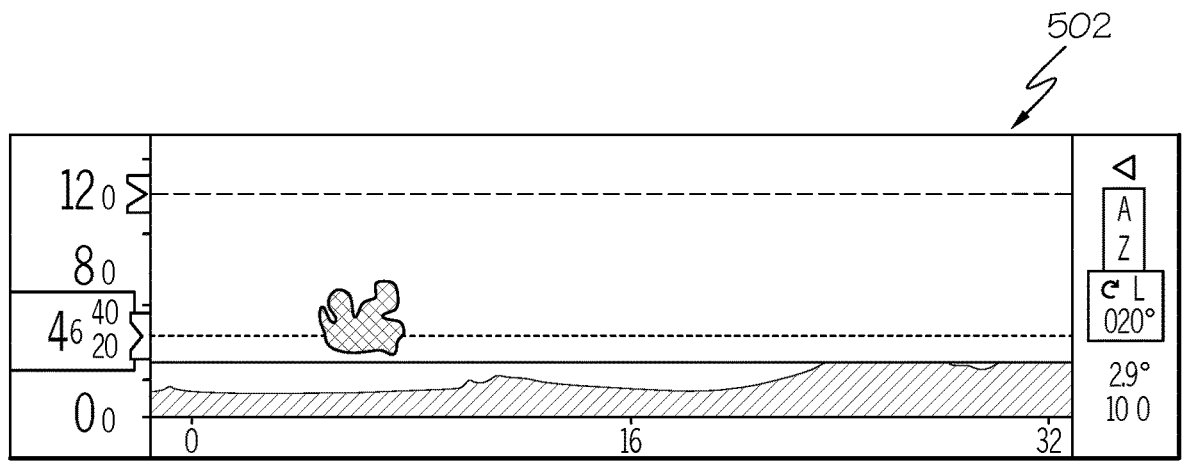
FIGS. 5a-5c show a series of displays for compliance and noncompliance with ATC commands for aircraft altitude settings in accordance with one embodiment.
Figure 5B:
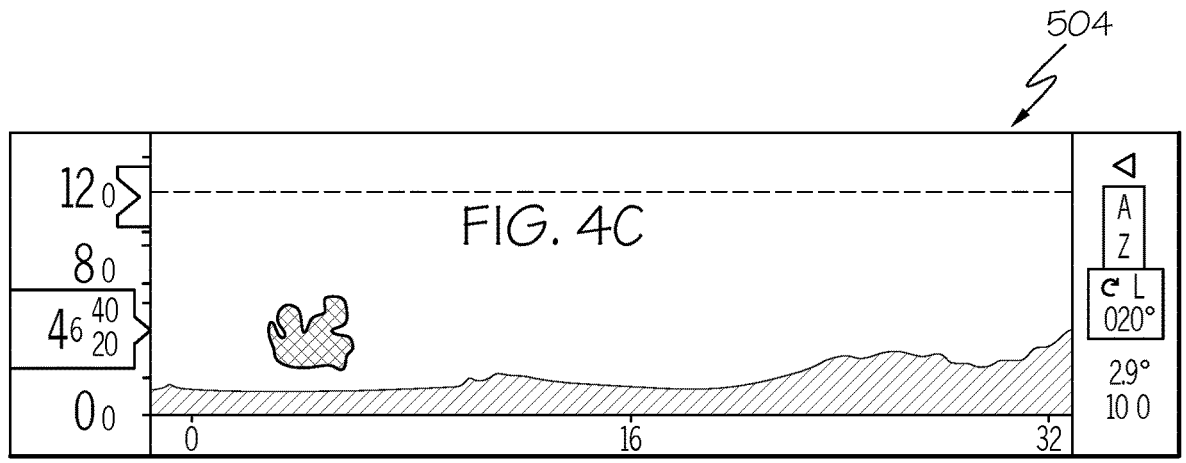
Figure 5C:
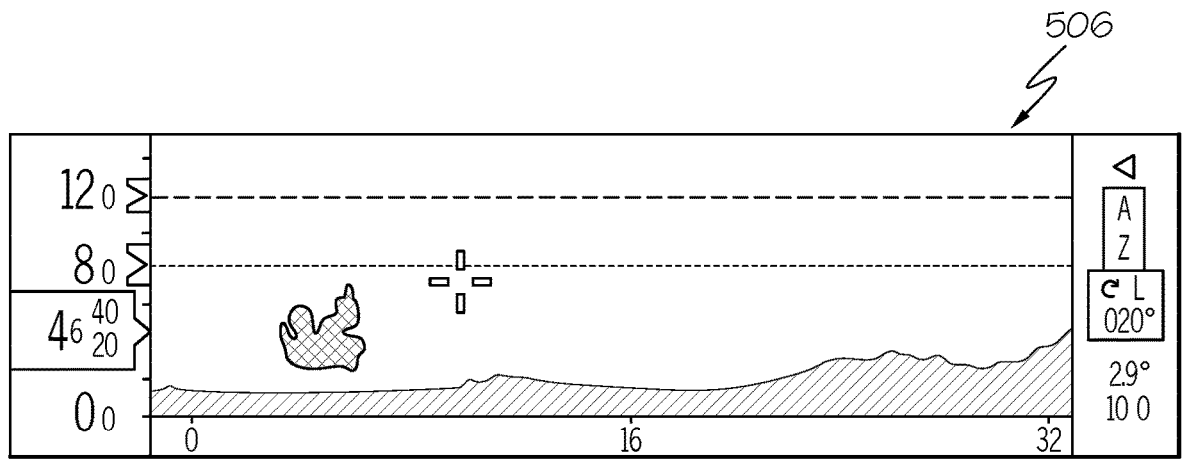

Turning now to FIGS. 5a-5c, a series of displays are shown that demonstrate examples of both compliance and noncompliance with ATC commands for the aircraft altitude setting. FIG. 5a shows a display 502 of an aircraft flying at an altitude of 4600 ft. The aircrew receives an ATC command to climb to 12,000 ft. and the aircrew acknowledges the command. In FIG. 5b, the display 504 shows compliance with the ATC command as the crew sets the altitudes of the selector to 12,000 ft. In contrast, FIG. 5c shows a display 506 where the crew acknowledges the ATC command but sets the altitudes selector to 8000 ft. instead of the instructed altitude of 12,000 ft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of monitoring compliance with air traffic control (ATC) instructions by an aircrew of an aircraft, comprising:
   receiving voice and text ATC commands with an ATC instruction moderator support system (AIMSS) on board the aircraft;
   converting the voice and text ATC commands into a data format with the AIMSS;
   determining an expected aircraft state with the AIMSS based on the data formatted ATC commands;
   determining a current aircraft state with the AIMSS based on flight performance sensors on board the aircraft;
   determining if the current aircraft state is in non-compliance classification with the expected aircraft state;
   determining if the non-compliance classification is allowable based on predetermined exceptions to ATC commands, where no alert for the aircrew is generated if the non-compliance classification is allowable, and where predetermined exceptions to ATC commands comprise a deviation from a Standard Operating Procedure (SOP) for the aircraft during normal aircraft operations that takes precedence over the non-compliance classification;
   classifying the non-compliance classification by the aircrew as either no action or incorrect action; and
   generating an alert with the non-compliance classification for the aircrew with the AIMSS if the current aircraft state is not in compliance with the expected aircraft state.

2. The method of claim 1, further comprising:
   delaying generating an alert for a defined time period in order to give the aircrew time to acknowledge the ATC commands and to bring the current aircraft state into compliance with the expected aircraft state.

3. The method of claim 1, further comprising:
   generating an ATC alert with the non-compliance classification for an ATC ground station with the AIMSS if the current aircraft state is not in compliance with the expected aircraft state.

4. The method of claim 1, where the alert is a visual display.

5. The method of claim 1, where the alert is a textual message.

6. The method of claim 1, where the alert is aural.

7. The method of claim 1, where the alert for the non-compliance classification is a visual cue.

8. The method of claim 1, where the alert for the non-compliance classification is a datalink.

9. The method of claim 1, where a predetermined exception to ATC commands is a Controlled Flight into Terrain (CFIT) alert.

10. The method of claim 1, where a predetermined exception to ATC commands is a Resolution Advisory (RA) provided by a Traffic Collision Avoidance System (TCAS).

11. The method of claim 1, where a predetermined exception to ATC commands is a Pre-Selector Altitude (PSA) setting for a missed approach altitude.

12. The method of claim 1, further comprising:
   determining corrective actions for the aircrew to correct the non-compliance classification with the expected aircraft state and displaying the desired corrective actions upon acknowledgement of the voice and text ATC commands by the aircrew.

13. The method of claim 12, where the corrective actions are selected from a rules database.

14. The method of claim 13, where the rules database incorporates the current aircraft state in selection of the corrective actions.

15. A system of monitoring compliance with air traffic control (ATC) instructions by an aircrew of an aircraft, comprising:
   a radio on board the aircraft that receives both voice and text ATC commands;
   flight sensors on board the aircraft that collect flight data reflecting the current state of the aircraft;
   an ATC instruction moderator support system (AIMSS) on board the aircraft that,
      receives the voice and text commands,
      converts the voice and text ATC commands into a data format, determines an expected aircraft state based on the data format ATC commands,
      receives a current state of the aircraft from the flight sensors and compares the current state of the aircraft with the expected aircraft state,
      determines if the current aircraft state is in non-compliance classification with the expected aircraft state,
      determines if any non-compliance classification is allowable based on predetermined exceptions to ATC commands, where alert for the aircrew is not generated if the non-compliance classification is allowable, and where predetermined exceptions to ATC commands comprise a deviation from a Standard Operating Procedure (SOP) for the aircraft during normal aircraft operations that takes precedence over the non-compliance classification, and
      generates an alert if the current state of the aircraft is in non-compliance classification with the expected state of the aircraft; and
   a crew interface that receives and displays the alert to the aircrew.

16. The system of claim 15, where the AIMSS on board the aircraft further,
   determining corrective actions for the aircrew to correct the non-compliance classification with the expected aircraft state.

17. The system of claim 16, further comprising:
   a rules database that stores corrective actions to correct the non-compliance classification with aircraft states, where the rules database provides the desired corrective action to the AIMSS.

18. The system of claim 17, where the rules database incorporates the current aircraft state in selection of the corrective actions for the aircrew.

* * * * *